United States Patent

[11] 3,530,798

| | | |
|---|---|---|
| [72] | Inventor | Marc Henri Jean Faure<br>Saint-Maur-des-Fosses, France |
| [21] | Appl. No. | 666,821 |
| [22] | Filed | Sept. 11, 1967 |
| [45] | Patented | Sept. 29, 1970 |
| [73] | Assignee | Bertin et Compagnie<br>Paris, France<br>a company of France |
| [32] | Priority | Sept. 14, 1966 |
| [33] | | France |
| [31] | | 76,394 |

[54] FLUID CUSHION SUPPORTED AND GUIDED VEHICLE AND TRACK SYSTEM
5 Claims, 4 Drawing Figs.

[52] U.S. Cl. .................................................. 104/23,
104/111, 104/120, 104/155, 105/144, 105/145
[51] Int. Cl. ...................................................... B61b
13/06, B61c 13/08, E01b 25/08
[50] Field of Search ............................................ 104/23FS,
23, 134, 138; 180/128; 104/120, 119, 155;
105/144, 145

[56] References Cited
UNITED STATES PATENTS

| | | | |
|---|---|---|---|
| 3,167,145 | 1/1965 | Mackie .......................... | 212/134 |
| 3,330,221 | 7/1967 | Trillo ............................. | 104/120 |
| 3,190,235 | 6/1965 | Bertin et al. .................. | 104/134 |
| 3,332,361 | 7/1967 | Bertin et al. .................. | 104/120 |
| 3,347,170 | 10/1967 | Bertin et al. .................. | 104/120 |

Primary Examiner—Arthur L. La Point
Assistant Examiner—Howard Beltran
Attorney—Stevens, Davis, Miller and Mosher ABSTRACT: Ground effect machine movable along a track with a fluid medium being interposed between the outer surface of said track and adjacent solid parts of said machine, for supporting and guiding the latter by exertion of forces bearing upon said track outer surface, said interposed fluid medium being partly at a relative overpressure and partly at a relative underpressure with respect to the ambient pressure, said overpressure and said underpressure being respectively created by the suction and the discharge of a same generator.

Patented Sept. 29, 1970 3,530,798
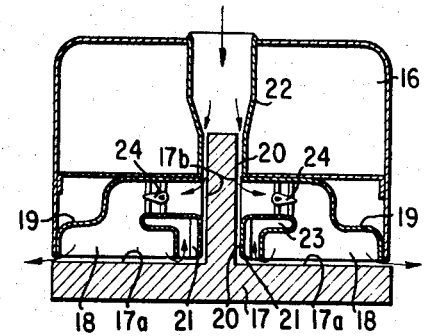
FIG. 1
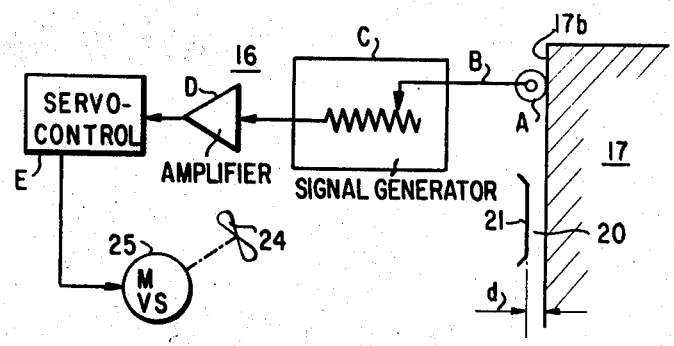
FIG. 2
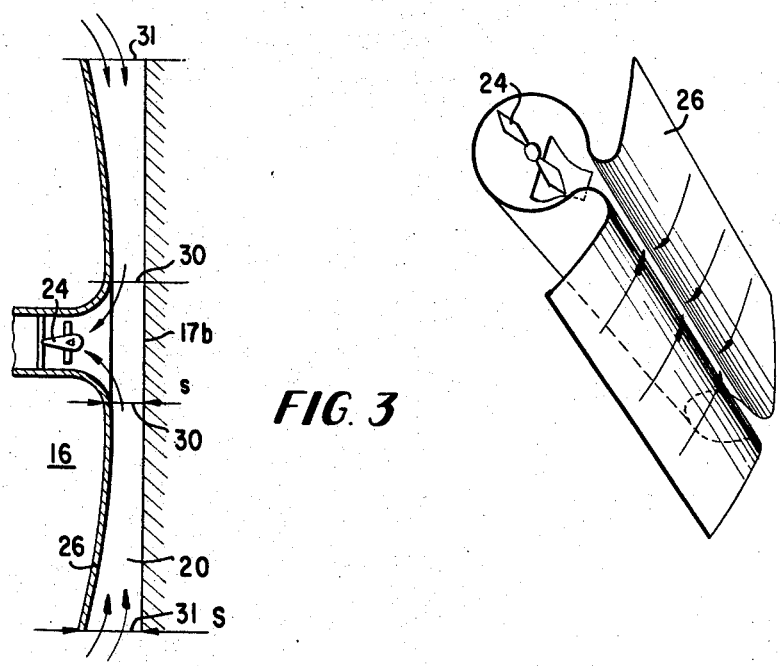
FIG. 3
FIG. 4
INVENTOR
M. H. J. FAURE
BY Stevens, Davis, Miller & Mosher
ATTORNEYS

FLUID CUSHION SUPPORTED AND GUIDED VEHICLE AND TRACK SYSTEM

This invention relates to a transport system using at least one negative pressure fluid layer produced between a guide track and a wall, the same experiencing, in opposed relationship, the ambient pressure and the reduced pressure which an appropriate device maintains in the underpressure fluid layer, the reduced pressure being controlled to provide stability.

The pressure difference between the inside of the fluid layer and the surrounding medium originates suction forces which tend to apply such wall against the guiding track.

The balance of such a system is usually unstable; assuming that it is balanced at a particular time and that the distance between the vehicle and the track then decreases, then the negative pressure in the fluid layer increases and the vehicle tends to stick to the track. The negative pressure must therefore be controlled if stability is to be inherent.

For instance, the negative-pressure generator can be controlled in response to the distance between the vehicle and the track, such distance being sensed by a roller mounted on an articulated arm or by variation of an electrical capacitant or of a magnetic field or by any other appropriate means. Alternatively, the walls which bound the negative pressure fluid layer can be so shaped that the required stability is obtained inherently.

The system according to the invention comprises in combination overpressure fluid cushions, in addition to the above negative pressure layer, said overpressure and said negative pressure being generated by a same blower or the like, the suction side of which is connected to the negative pressure layer while its discharge side is connected to an overpressure cushion.

In the drawings:

FIG. 1 is a diagrammatic cross section of a vehicle in accordance with the invention, on its guide track.

FIG. 2 illustrates diagrammatically a stabilizing control.

FIG. 3 is a diagrammatic section of an alternative embodiment.

FIG. 4 is a perspective view of the latter.

FIG. 1 shows a vehicle 16 sustained, above a track 17 of inverted-T section, by two compressed air cushions 18 bounded by bell-shaped walls 19. The cushions 18 bear against the horizontal faces 17a of the track 17.

The cushions 18 are fed with compressed air delivered by two fans 24 of horizontal axis which suck from the center of two fluid layers 20 bounded by plates 21 and the vertical faces 17b of the track. A duct 22 and passages 23 connect peripherally the fluid layers 20 to the atmosphere. The fans 24 have therefore a twofold purpose: they maintain the spaces 20 under negative pressure and the supporting cushions 18 under positive pressure.

Such a transport system is in many respects similar to the one described in Bertin et al. No. 3,190,235 and No. 3,347,170 but distinguishes basically therefrom in that guiding is achieved, no longer by pressure exerted on the vertical faces of the track by mechanical members or compressed air cushions, but by vacuum or rather negative pressure spaces, this vacuum being generated by the suction of the same fans which operate furthermore for discharging air into the supporting cushions formed upon the horizontal track faces.

However a device operating by means of negative pressure is normally unstable, for assuming that the device is balanced at a given set of fan operating conditions and that the clearance between the corresponding plate 21 and track guiding surface 17b decreases, then the negative pressure increases. The suction force therefore increases and the vehicle sticks to the rail 17, especially as, at the other side thereof, the vehicle moves away from the opposite face 17b and the negative pressure and therefore the suction force decreases thereon.

The distance $d$ (see FIG. 2) between the vehicle and the track must therefore be sensed and the fan operating conditions must be made responsive to such distance. One form of sensing is, for instance, to use a roller A mounted on an articulated arm or push-rod B carried by the vehicle 16 and urged so that roller A engages the guiding surface 17b of track 17. Alternatively, variations in clearance $d$ may be sensed by detecting corresponding variations in electrical capacitance or magnetic field between plate 21 and guiding surface 17b. In any case, the operating conditions of the motor 25 which drives each fan 24 (and therefore the negative pressure produced in the respective space 20) is controlled by the sensor A via any appropriate transmission and control connection which is sensitive and has a very quick response time.

Thus, displacements of sensor A transmitted through rod B are converted into electric signals by a signal generator C, say a potentiometer, these signals being applied, after amplification through amplifier D, to a servo-control E to correspondingly vary the running of fan 24.

It is however preferred to achieve inherent stability by designing the plates 21 so that the relationship $s/S$, where $s$ denotes the central outlet area of the annular space 20 and S denotes its peripheral inlet area, decreases when the vehicle moves toward the track face 17b.

This occurs when the distance between the walls bounding the space 20 decreases.

Such an arrangement is shown in FIGS. 3 and 4 wherein the space 20 bounded by a plate 26 and the track guiding surface 17b, forms a convergent passage. The fan 24 maintains the space 20 at a negative pressure, the air moving in the direction indicated by arrows.

The shape of the plate 26 is such that there is a constriction 30 in the path of the air in the space 20. When the vehicle moves towards 17b, the width of the constriction 30 decreases; the negative pressure in the center of the plate 26 increases, which causes a destabilizing effect. However, since the ratio of the inlet area S at the plate periphery 31 to the outlet area $s$ at the neck 30 increases, the air velocity —and therefore the negative pressure— decrease between the periphery 31 of the space 20 and the neck 30. Eventually the suction force decreases and the device is stable, for in this case the resultant of pressure forces acting on the plate 26 upstream of the constriction 30 is greater than the resultant of forces acting on the plate downstream of the constriction when the vehicle moves away from the track face 17b. Of course, the plate 26 which defines with face 17b the convergent-divergent passage 20 having its neck at 30 must be rigid and must be free from local distortions of its shape.

I claim:

1. A transportation system comprising a track having distinct operative ground-effect surfaces which are not coplanar, a ground-effect machine movable along said track and defining with said operative track surfaces respective spaces for separate interposed fluid layers whereby said machine is supported and guided on said track by fluidic exertion of forces bearing upon said operative track surfaces, wherein the improvement comprises a generator having a suction side and a discharge side respectively connected to said spaces, said generator, in operation, being adapted to create a relative underpressure at said suction side and at the space connected thereto and a relative overpressure at said discharge side and at the space connected thereto.

2. System as claimed in claim 1, wherein said track comprises substantially horizontal lift surfaces and substantially vertical guiding surfaces.

3. A ground-effect machine designed to be supported and guided by a track system and to define therewith separate and distinct, non-coextensive functional spaces fluidly correlating said machine with said track system, comprising a pumping device having a low-pressure suction side and a high-pressure delivery side, suction means connecting said low-pressure suction side to one of said functional spaces for building therein a negative cushion under relative vacuum whereby a fluidic attraction effect develops on said machine with respect to said track system at said one of said functional spaces, and delivery means connecting said high-pressure delivery side to another of said functional spaces, separate and distinct from said one functional space, for building in said other functional space a positive cushion under relative over-pressure whereby a fluidic repulsion effect develops on said machine with respect to said track system at said other functional space.

4. Ground-effect machine as claimed in claim 3, wherein said non-coextensive functional spaces have substantially orthogonal orientations, extending generally horizontally and vertically to develop fluidic effects which are respectively substantially vertical and horizontal.

5. Ground-effect machine as claimed in claim 4, wherein said one of said functional spaces extends generally vertically and said fluidic attraction effect which develops therein is substantially horizontal, whereas said other of said functional spaces extends generally horizontally and said fluidic repulsion effect which develops therein is substantially vertical and oriented upwardly.